US006604393B2

(12) United States Patent
Larsen et al.

(10) Patent No.: US 6,604,393 B2
(45) Date of Patent: Aug. 12, 2003

(54) LOCK SYSTEM OPERABLE WITH MULTIPLE KEYS

(75) Inventors: Marvin L. Larsen, New Hampton, IA (US); Dave S. Magner, Calmar, IA (US)

(73) Assignee: Tri/Mark Corporation, New Hampton, IA (US)

( * ) Notice: Subject to any disclaimer, the term of this patent is extended or adjusted under 35 U.S.C. 154(b) by 0 days.

(21) Appl. No.: 09/903,036

(22) Filed: Jul. 11, 2001

(65) Prior Publication Data

US 2003/0010073 A1 Jan. 16, 2003

(51) Int. Cl.[7] ........ B60R 25/02

(52) U.S. Cl. ........ 70/208; 70/337; 70/340; 70/379 R

(58) Field of Search ........ 70/208, 337–343, 70/379 R, 380, 369

(56) References Cited

U.S. PATENT DOCUMENTS

| | | | | | |
|---|---|---|---|---|---|
| RE11,119 | E | | 11/1890 | Smith | 70/338 |
| 953,777 | A | | 4/1910 | Cooke | 70/338 |
| 1,233,733 | A | | 7/1917 | Voight | 70/337 |
| 1,482,189 | A | | 1/1924 | Heyer | 70/338 |
| 1,650,568 | A | | 11/1927 | Hurd | 70/338 |
| 3,183,692 | A | | 5/1965 | Check | 70/338 |
| 3,257,831 | A | | 6/1966 | Schlage | 70/383 |
| 3,875,773 | A | * | 4/1975 | Thimot | 70/337 |
| 3,973,421 | A | * | 8/1976 | Patriquin | 70/337 X |
| 4,057,987 | A | * | 11/1977 | Patriquin | 70/337 X |
| 4,068,507 | A | * | 1/1978 | Peterson | 70/337 X |
| 4,069,694 | A | | 1/1978 | Raymond et al. | 70/337 |
| 4,075,879 | A | * | 2/1978 | Christopher | 70/337 |
| 4,335,595 | A | * | 6/1982 | Swan et al. | 70/149 |
| 4,357,815 | A | * | 11/1982 | Kleefeldt et al. | 70/337 |
| 4,376,382 | A | | 3/1983 | Raymond et al. | 70/338 |
| 4,474,042 | A | * | 10/1984 | Patriquin | 70/337 |
| 4,630,457 | A | * | 12/1986 | Kincaid et al. | 70/337 X |
| 4,631,941 | A | | 12/1986 | Sjunnesson | 70/337 |
| 4,704,884 | A | | 11/1987 | Sugimoto | 70/337 |
| 5,000,019 | A | | 3/1991 | Foster | 70/338 |
| 5,046,342 | A | * | 9/1991 | Urby | 70/337 |
| 5,127,686 | A | * | 7/1992 | Gleason et al. | 70/208 X |
| 5,181,406 | A | * | 1/1993 | Wolter | 70/337 |
| 5,431,034 | A | * | 7/1995 | Fann et al. | 70/337 X |
| 5,606,882 | A | * | 3/1997 | Larsen et al. | 70/369 |
| 5,927,773 | A | * | 7/1999 | Larsen et al. | 70/208 X |
| 6,047,577 | A | | 4/2000 | Klimas | 70/340 |
| 6,119,495 | A | * | 9/2000 | Loreti | 70/340 |
| 6,389,859 | B1 | * | 5/2002 | Paolini et al. | 70/340 |

* cited by examiner

*Primary Examiner*—Suzanne Dino Barrett
(74) *Attorney, Agent, or Firm*—Wood, Phillips, Katz, Clark & Mortimer

(57) ABSTRACT

A key operated, lock actuating system having a housing and a lock cylinder that is pivotable relative to the housing around a first axis. An actuator assembly is pivotable around the first axis between a fully locked position and an unlocked position. The lock actuating system includes a first key having a first configuration and a second key having a second configuration. The first key can be used to change the actuator assembly between the locked and unlocked positions. The second key, which cannot be fully inserted to be operable with the actuator assembly in the locked position, can be used to change the actuator assembly between the unlocked position and an intermediate locked position.

20 Claims, 6 Drawing Sheets

LOCK SYSTEM OPERABLE WITH MULTIPLE KEYS

BACKGROUND OF THE INVENTION

1. Field of the Invention

This invention relates to key operated lock systems and, more particularly, to a lock system which in one state is operable with one key, and which is operable using another key to place the lock system in a second state wherein the one key cannot be used to operate the lock system.

2. Background Art

Key operated lock systems are used in myriad different environments. Many of these lock systems are designed to be operable using multiple, different keys. Often, lock systems that are operable using different customer keys are constructed to be operable by a master key. As just one example, a dealer having on hand a yard filled with recreational vehicles or fifth wheel vehicles may wish to have a single key that permits universal access to all vehicles. This is a convenience to the dealer since a master key obviates the need to identify one specific customer key that will operate the lock system on a given vehicle.

While having a master key is a convenience to the dealer, there is a potential security risk in the event that the master key finds its way into the wrong hands. Every vehicle on the premises of the dealer and every customer purchased vehicle is at risk that the possessor of the master key will make an unauthorized use thereof.

This same problem exists with lock systems that are operable using any of multiple different keys. That is, a breach of security with a customer's lock system may occur by the unauthorized use of a second type of key that is different than the customer's key.

The art is replete with lock systems that are operable with multiple different keys. Some of these systems tend toward the complex. Complexity often becomes associated with increased manufacturing costs and reduced reliability.

One such lock system has a first state wherein it is operable by two different keys and a second state wherein it is operable by only one key. U.S. Pat. No. 3,257,831 shows such a structure. In this patent, operation of the lock system with one key results in the repositioning of a ring which blocks insertion of the other key.

SUMMARY OF THE INVENTION

In one form, the invention is directed to a key operated, lock actuating system having a housing and a lock cylinder that is pivotable relative to the housing around a first axis. An actuator assembly is pivotable around the first axis between a fully locked position and an unlocked position. The lock actuating system includes a first key having a first configuration and a second key having a second configuration. The lock cylinder has a keyway into which each of the first and second keys can be directed with the lock cylinder pivoted relative to the housing into a key removable position. The lock cylinder has a repositionable element which is changed from a first position into a second position as an incident of the second key being directed into the keyway. The lock cylinder is configured so that direction of the first key into the keyway does not cause the repositionable element to be placed into the second position. A first surface on the lock cylinder and a second surface on the actuator assembly cooperate to allow the lock cylinder to act against and pivot the actuator assembly in one direction around the first axis as the key cylinder is pivoted from the key removal position in the one direction to thereby move the actuator assembly from the unlocked position toward the locked position. The lock cylinder has a third surface and the actuator assembly has a fourth surface which cooperate with the repositionable element in the second position and not in the first position to allow the third surface to act against the fourth surface as the lock cylinder is pivoted oppositely to the one direction to thereby move the actuator assembly toward the key removal position. The lock cylinder is pivotable with the first key directed into the keyway, with the lock cylinder in the key removable position and the actuator assembly in the unlocked position, in the one direction around the first axis sufficiently to cause the first surface to act against and move the second surface so that the actuator assembly is placed in the fully locked position. The lock cylinder is thereafter pivotable oppositely to the one direction around the first axis to place the lock cylinder in the key removal position without changing the actuator assembly from the fully locked position. The lock cylinder is pivotable with the second key directed into the keyway with the lock cylinder in the key removal position and the actuator assembly in the unlocked position in the one direction around the first axis sufficiently to cause the first surface to act against and move the second surface so that the actuator assembly is placed in the fully locked position. The lock cylinder is thereafter pivotable oppositely to the one direction around the first axis which causes the third surface to act against the fourth surface to thereby move the actuator assembly from the fully locked position to an intermediate position between the fully locked and unlocked positions as the actuator assembly is moved into the key removal position.

In one form, the housing defines a cavity within which the lock cylinder resides.

The actuator assembly may include an extension which projects into the housing cavity and defines the fourth surface.

The repositionable element may be a wafer that is movable transversely to the first axis between the first and second positions.

In one form, the second surface faces circumferentially relative to the first axis on the actuator assembly.

In one form, with the second key directed into the keyway and the actuator assembly in the fully locked position, pivoting of the lock cylinder oppositely to the one direction causes the lock cylinder to pivot a predetermined amount before the third surface acts against the fourth surface.

In one form, the third surface is defined on the repositionable element.

In one form, there is a single piece on the actuator assembly that extends fully around the first axis and defines the second surface.

The single piece may define the fourth surface.

In one form, with the first key directed into the keyway, the lock cylinder is pivotable oppositely to the one direction to cause the third surface to move in a curved path toward and past the fourth surface.

The invention is also directed to the combination of a lock element that is movable between a secured position and an unsecured position and a key operated lock actuating system, as described above. As the actuator assembly moves from the locked position into the unlocked position, the lock element moves from the secured position into the unsecured position.

In one form, with the actuator assembly moved from the fully locked position to the intermediate position, the lock element remains in the secured position.

The lock element may be either pivotable or translatable between the secured and unsecured positions.

The actuator assembly may directly engage the lock element.

Alternatively, there is an intermediate element that is separate from and movable relative to the actuator assembly and the lock element and transmits movement between the actuator assembly and the lock element.

The invention is also directed to a method of actuating a key operated lock system. The method includes the steps of: directing a first key having a first configuration into a keyway in a lock cylinder that is pivotable around a first axis so that the lock cylinder is placed in a first state; pivoting the lock cylinder in a first direction around the first axis with the first key directed into the keyway from a key removal position through a first range to thereby pivot an actuator assembly around the first axis between an unlocked position and a fully locked position as an incident of which a lock element is changed from an unsecured state into a secured state; pivoting the lock cylinder oppositely to the first direction around the first axis with the first key directed into the keyway through the first range to thereby place the lock cylinder in the key removal position so that the actuator assembly pivots through a second range from the unlocked position into the fully locked position; removing the first key with the lock cylinder in the key removal position; directing a second key having a second configuration into the keyway so that the lock cylinder is placed in a second state that is different than the first state; pivoting the lock cylinder in the first direction around the first axis with the second key directed into the keyway from the key removal position through the first range to thereby pivot the actuator assembly around the first axis between the unlocked position and the fully locked position; pivoting the lock cylinder oppositely to the first direction around the first axis with the second key directed into the keyway through the first range to thereby a) place the lock cylinder in the key removal position and b) pivot the actuator assembly from the fully locked position through less than the second range toward but not into the unlocked position; and removing the second key from the keyway with the lock cylinder in the key removal position.

The method may further include the step of relatively repositioning the lock cylinder and actuator assembly so that the second key cannot be directed fully into the keyway with the actuator assembly in the fully locked position and the lock cylinder in the key removal position.

The lock element may be changed between the unsecured state and secured state by either pivoting or translation.

BRIEF DESCRIPTION OF THE DRAWINGS

FIGS. 5*a*, 5*b*–7*a*, 7*b* are corresponding cross-sectional views through lines A—A and B—B, respectively, in FIG. 4, and showing relative positions of the lock cylinder and actuator assembly with: the lock cylinder in a key removal position and the actuator assembly in an unlocked position in FIGS. 5*a* and 5*b*; the lock cylinder repositioned to place the actuator assembly in a locked position in FIGS. 6*a* and 6*b*; and the lock cylinder in a key removal position and the actuator assembly in the locked position in FIGS. 7*a* and 7*b;*

FIGS. 8a, 8*b*–11*a*, 11*b* are corresponding cross-sectional views through lines A—A and B—B, respectively, in FIG. 8, and showing relative positions of the lock cylinder and actuator assembly with: the lock cylinder in a key removal position and the actuator assembly in an unlocked position in FIGS. 8*a* and 8*b*; the lock cylinder repositioned to place the actuator assembly in a locked position in FIGS. 9*a* and 9*b*; with the lock cylinder transitioned back towards the key removal position and the actuator assembly in the locked position in FIGS. 10*a* and 10*b*; and the lock cylinder moved into the key removal position and the actuator assembly moved by the locked cylinder into a intermediate locked position in FIGS. 11*a* and 11*b*.

DETAILED DESCRIPTION OF THE DRAWINGS

Figures 1, 3:
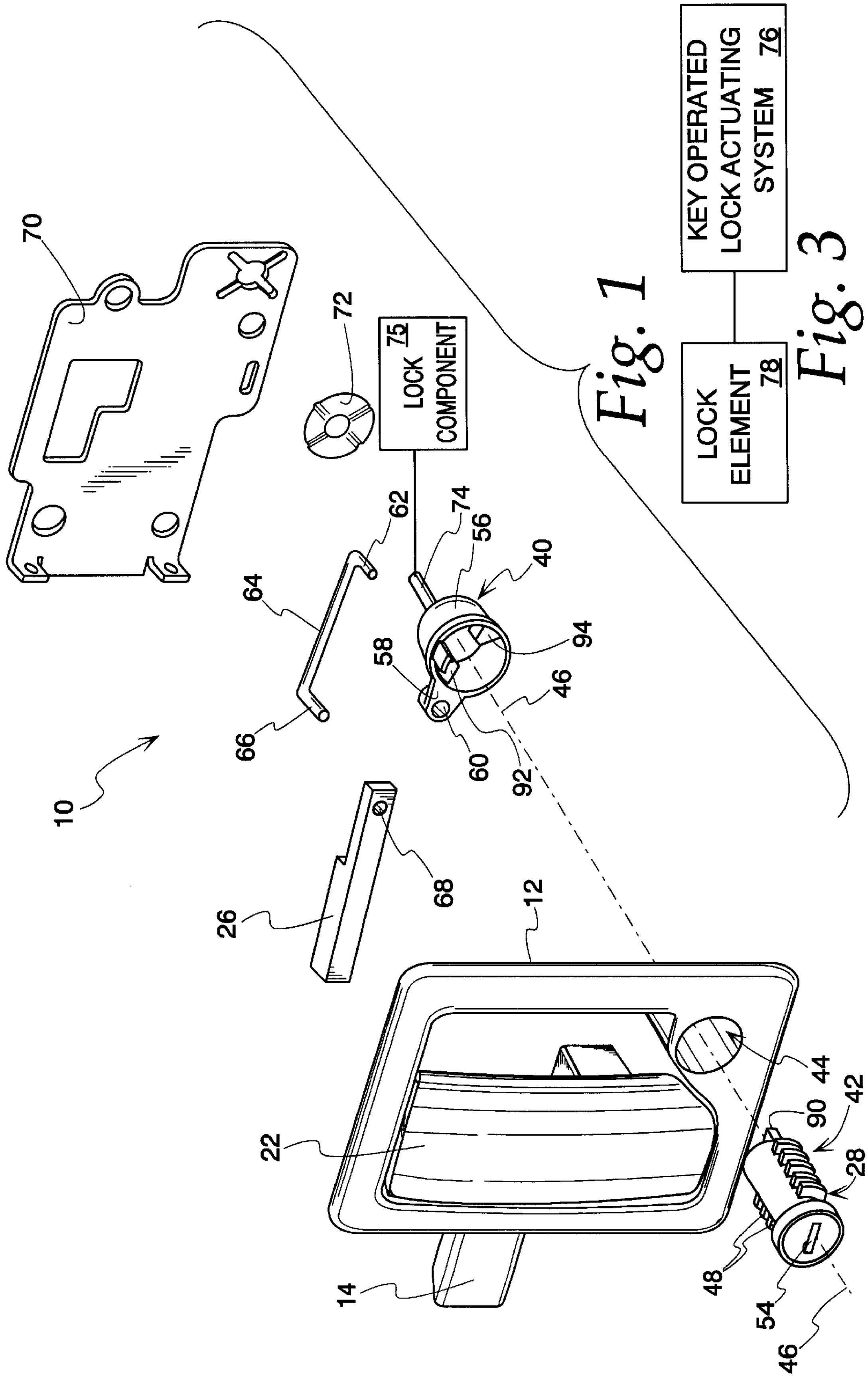
FIG. 1 is an exploded perspective view of a lock system having a deadbolt lock element and key operated lock actuating system for operating the deadbolt, according to the present invention.
FIG. 3 is a schematic representation of a lock system according to the present invention.
Figure 2:
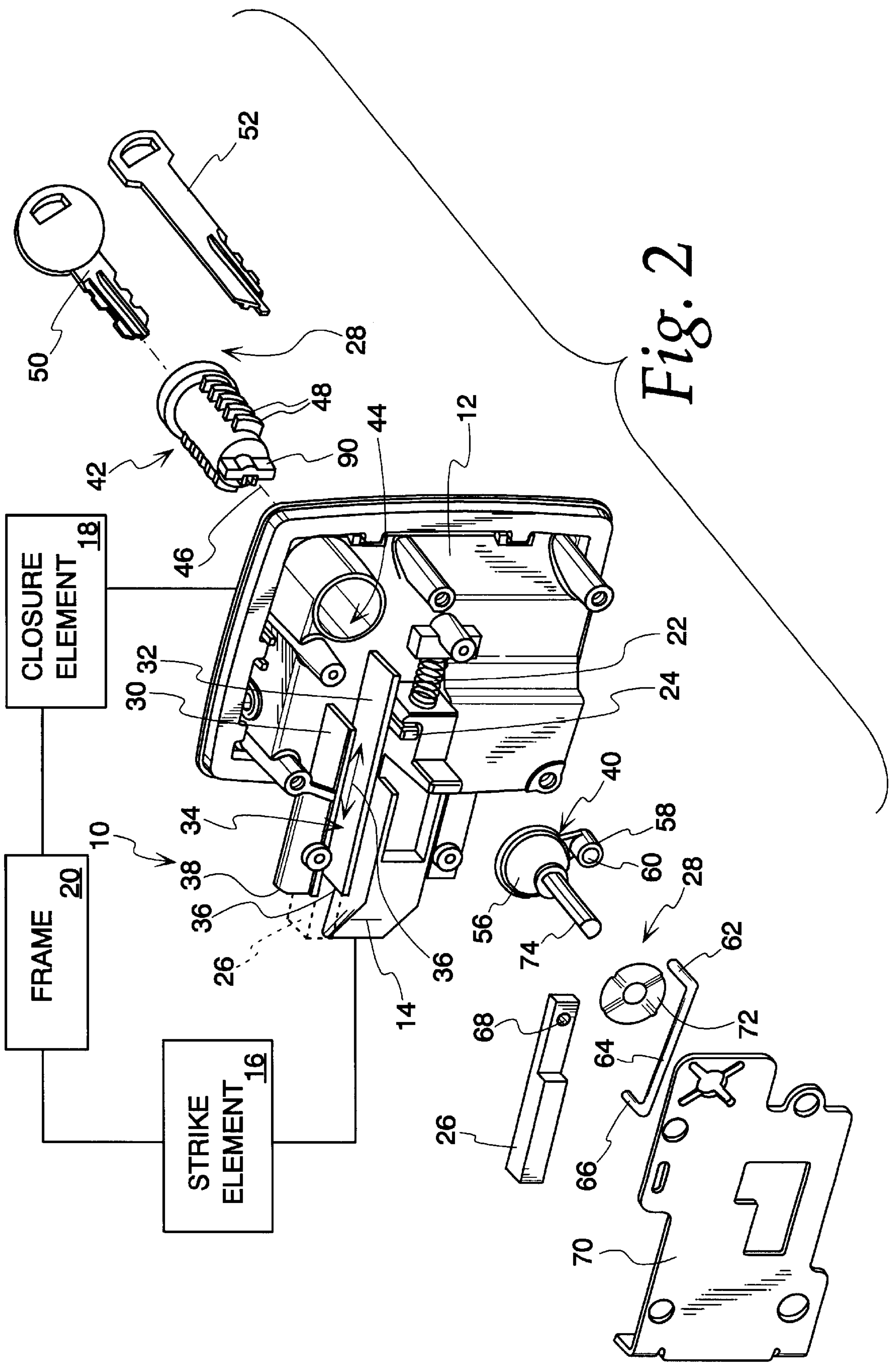
FIG. 2 is an exploded perspective view of the lock system taken from the side opposite that in FIG. 1.

In FIGS. 1 and 2, a lock system, of the type suitable for incorporation of the present invention, is shown at 10. The lock system 10 is intended only to be an exemplary environment for the present invention, which can be practiced using myriad different types of lock system configurations. The lock system 10 has a cup-shaped housing 12 which mounts a conventional-type latch element 14 to cooperate with a strike element 16. Typically, the lock system 10 is mounted on a closure element 18 which is mounted movably between open and closed positions upon a frame 20 bearing the strike element 16. The latch element 14 can be moved from the latched position shown in FIGS. 1 and 2, translatingly against the force of a spring 22, to allow the latch element 14 to assume a latched position behind a part of the strike element 16. The latch element 14 can be manually repositioned by pivoting of a paddle 22, which causes a cantilevered extension 24 thereon to translate the latch element 14 out of the latched position. The details of operation of this type of latch are shown, for example, in U.S. Pat. No. 5,927,773, which is incorporated herein by reference.

The present invention is directed to a deadbolt lock element 26 and a key operated lock actuating system 28 for operating the lock element 26. The housing 12 has vertically spaced walls 30, 32 defining a channel 34 for guided translatory movement of the deadbolt lock element 26 in the direction of the double-headed arrow 36 between a secured position, shown in dotted lines in FIG. 2, wherein the deadbolt lock element 26 projects from the channel 34, and an unsecured position, wherein the deadbolt lock element 26 does not project from the left end of the channel in FIG. 2 to the same extent. In this embodiment, the deadbolt lock element 26 in the unsecured position is flush with the wall edges 36, 38.

The deadbolt lock element 26 is moved between the secured and unsecured positions by an actuator assembly 40, which is operatively connected to a lock cylinder 42 that is guidingly, pivotably mounted in a cavity 44 defined by the housing 12, for movement around an axis 46. The lock cylinder 42 has a series of wafers 48 which are radially repositioned by the introduction of a customer key 50 and a master key 52. Introduction of either key 50, 52 fully into a keyway 54 repositions the wafers 48 to allow the lock cylinder 42 to rotate around the axis 46 relative to the housing 12 in conventional manner. With no key in the keyway 54 the wafers 48 are positioned within one or more guideways (not shown) so as to fix the lock cylinder 42 against rotation relative to the housing 12. The basic, conventional operation of the lock cylinder wafers 48, and the cooperation with guideways within the cavity 44, will not be described in detail herein. This basic type of structure, and its operation, are shown in an exemplary lock cylinder in U.S. Pat. No. 5,606,882, incorporated herein by reference.

As will be explained in greater detail below, pivoting of the lock cylinder 42 around the axis 46 causes pivoting of the actuator assembly 40 around the same axis 46. The actuator assembly 40 has a one-piece body 56 having a radial extension 58 with a bore 60 therethrough defining a receptacle for a leg 62 of a U-shaped linkage element 64. The other "leg" 66 of the element 64 is receivable in a bore 68 through the deadbolt lock element 26. As described below, controlled pivoting of the actuator assembly 40 through the lock cylinder 42 selectively repositions the linkage element 64, and thereby the deadbolt lock element 26, between the secured and unsecured positions.

The operating components mounted on the housing 12 are captively maintained in their operative positions by a mounting plate 70, attached to the housing 12. A spacing washer 72 is interposed between the actuator assembly 40 and the mounting plate 70. A post 74 extends through the washer 72 and the mounting plate 70 and cooperates with another component 75 of the lock system 10 mounted on the side of the closure element 18 opposite the side on which the housing 12 is mounted. This arrangement allows the deadbolt feature to be operated selectively from either side of the closure element 18.

Before getting into the details of operation of the lock actuating system 28, it should be understood that the structure described above is only exemplary of an environment in which the present invention is intended to operate. As shown schematically in FIG. 3, the invention could be incorporated into any key operated lock actuating system 76 which is used to reposition a lock element 78 that may be repositioned between secured and unsecured positions by translation, pivoting, or otherwise. Further, the lock actuating system 76 may be directly engaged with the lock element 78 or indirectly engaged, as through the linkage element 64, or through any other type of mechanism.

Referring initially to FIGS. 4–9*b*, taken in conjunction with FIGS. 1 and 2, the operation of the lock system 10 will be described initially using the key 50. The "a" and "b" views are taken through lines A—A and B—B, respectively, in FIG. 4.

Figure 5B:
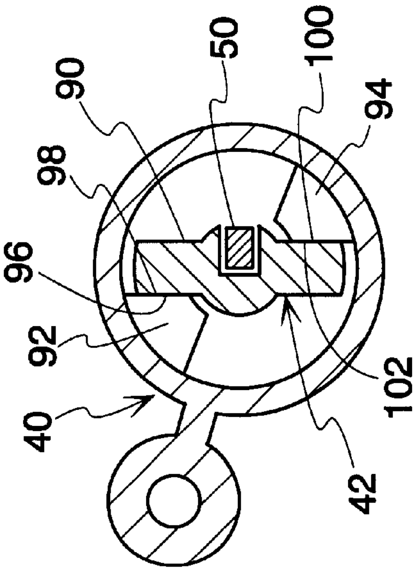
Figure 5A:
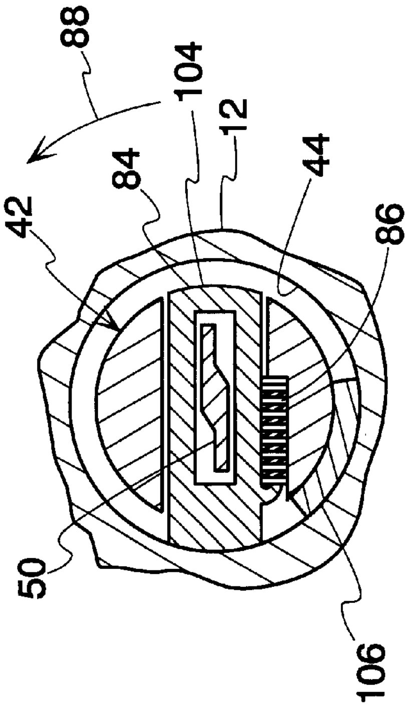
Figure 4:
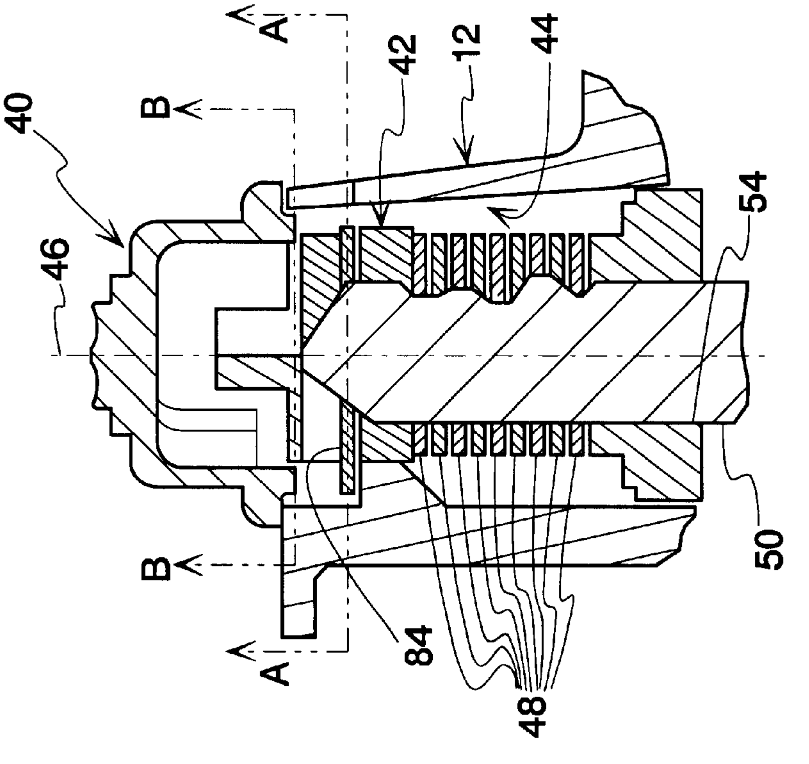
FIG. 4 is an enlarged, fragmentary, cross-sectional view of a cooperating lock cylinder and actuator assembly, according to the present invention, with a customer key inserted into a keyway on the lock cylinder.

With the key 50 inserted fully into the keyway 54, various wafers 48 are repositioned radially relative to the axis 46, and withdrawn from guideways in the housing 12, so that the lock cylinder 42 can pivot around the axis 46. According to the invention, the lock cylinder 42 includes a repositionable element 84, in the form of a wafer. The repositionable element 84 is normally biased by a coil compression spring 86 to a first position, as shown in FIGS. 4, 5*a*, 6*a*, and 7*a*. The key 50 is configured so as not to change the position of the repositioning element 84 from its first position upon full insertion into the keyway 54. The key 50 is insertable into the keyway 54 with the lock cylinder 42 in a key removal position, as shown in FIG. 5*a*. In FIG. 5*b*, the actuator assembly 40 is shown in an unlocked position, corresponding to the unsecured position for the lock element 26. As an incident of moving the lock cylinder 42 counterclockwise from the FIG. 5*a* position, as indicated by the arrow 88, a blade-shaped extension 90 of the lock cylinder 42, in axial overlapping relationship with diametrically oppositely located bosses 92, 94, is caused to bear against the actuator assembly 40 to drive the same to the fully locked position of FIG. 6*b*. More specifically, a circumferentially facing first surface 96 on the extension 90 bears against a facing second surface 98 on the boss 92 so that pivoting of the extension 90 imparts a like pivoting movement to the actuator assembly 40 around the same axis 46. At a diametrically opposite location to the surfaces 96, 98, circumferentially facing surfaces 100, 102 on the extension 90 and boss 94 cooperate in a like manner. The lock cylinder 42 and actuator assembly 40 thus pivot in the same range as the actuator assembly 40 is changed from the unlocked position o FIG. 5*b* into the fully locked position of FIG. 6*b*.

Figure 7B:
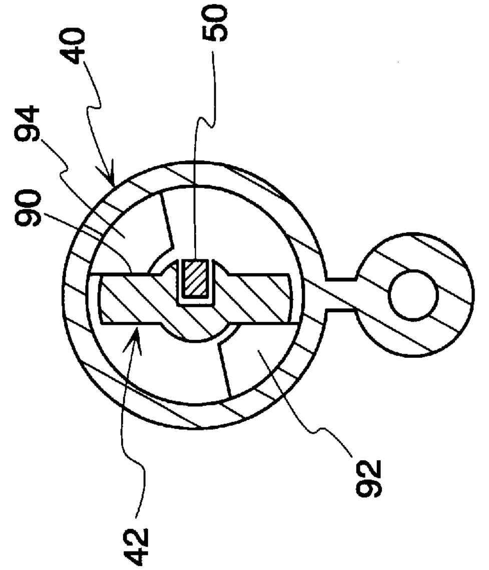
Figure 7A:
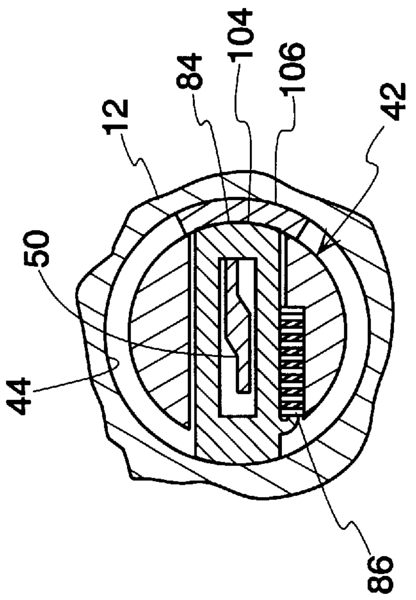
Figure 6B:
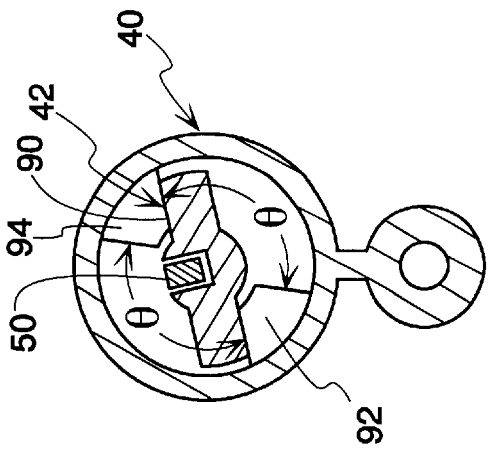
Figure 6A:
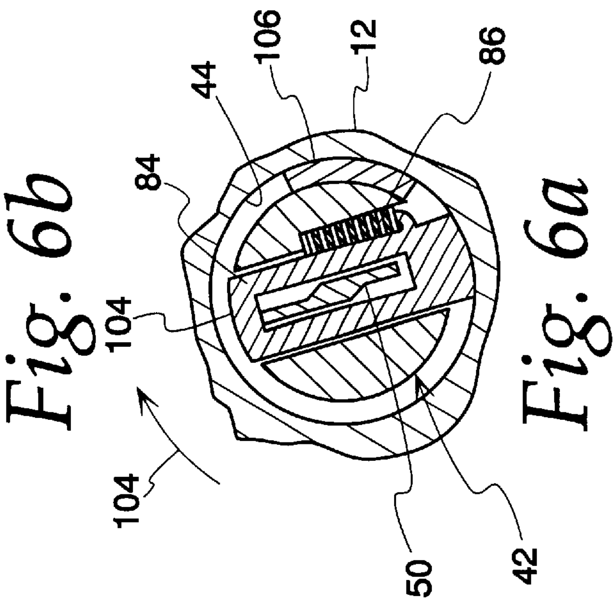

To remove the key 50, the lock cylinder 42 is pivoted from the 6*a* position in a clockwise direction, as indicated by the arrow 104, back to the position shown in FIG. 7*a*, which is the same position relative to the housing as in FIG. 5*a*. The circumferential spacing θ between the bosses 92, 94 is sufficient to allow the lock cylinder 42 to move from the FIG. 6*a* position back to the FIG. 7*a* position without causing an extension 106 of the lock cylinder 42, that is in axial overlapping relationship with the repositionable element 84, to pivotably reposition the actuator assembly 40. With the repositionable element 84 in the first position, the one end 104 thereof is allowed to pivot from the FIG. 6*a* position up to, and into circumferentially overlapping relationship with the extension 106 of the actuator assembly 40, as seen in FIG. 7*a*.

Figure 8B:
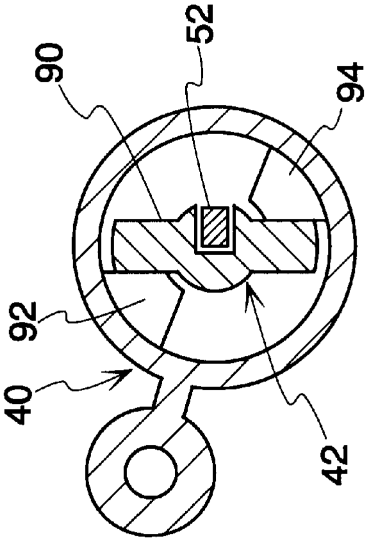

The operation of the lock system 10 will now be described with respect to FIGS. 8–11*b*, using the master key 52. The master key 52 is configured so that a leading edge 108 thereof cams the repositionable element 84 from the first position of FIG. 1, to the right in FIG. 8 to a second position, wherein it is substantially centered i.e. so that equal length portions thereof project into the chamber 44 at diametrically opposite locations. The master key 52 is configured to withdraw certain wafers 48 upon being fully inserted and move the repositionable element 84 to the second position shown in FIG. 8. The master key 52 is insertable with the lock cylinder 42 in the key removal position of FIG. 8*a*. The key 52 extends into the extension 90 in the same manner as the key 50 extends therein, as shown in FIGS. 8*b* and 5*b*, respectively. In FIG. 8*b*, the key 52 is shown inserted with the actuator assembly 40 in the unlocked position.

Figure 8A:
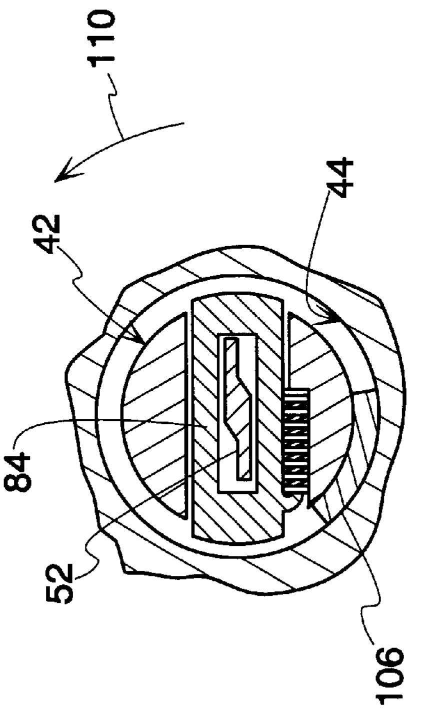
Figure 8:
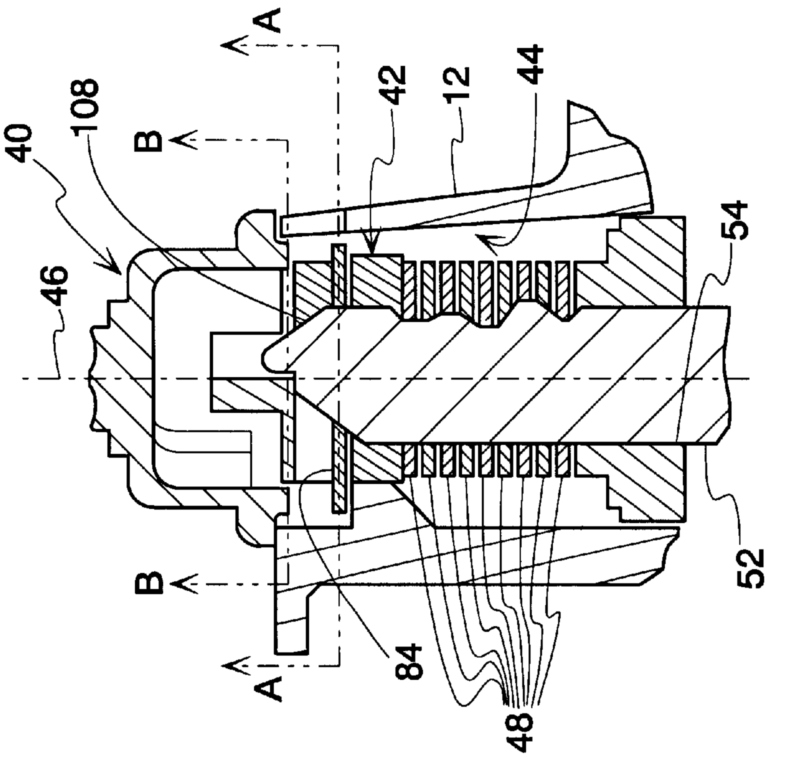
FIG. 8 is an enlarged, fragmentary, cross-sectional view of the cooperating lock cylinder and actuator assembly, as in FIG. 4, with a master key inserted into the keyway on the lock cylinder.
Figure 9B:
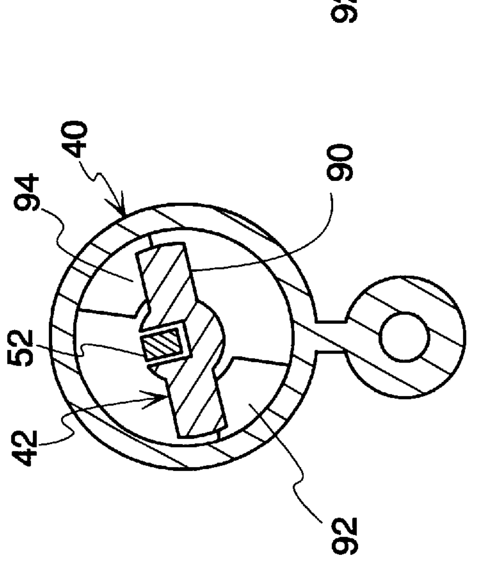
Figure 9A:
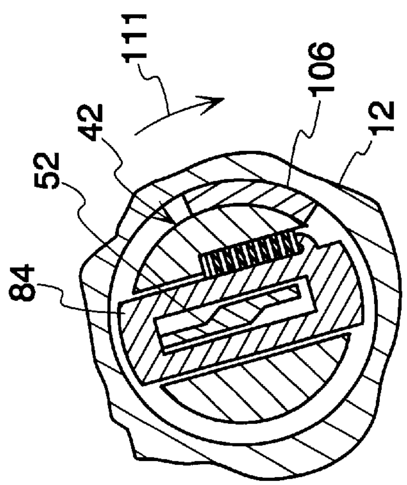
Figure 10B:
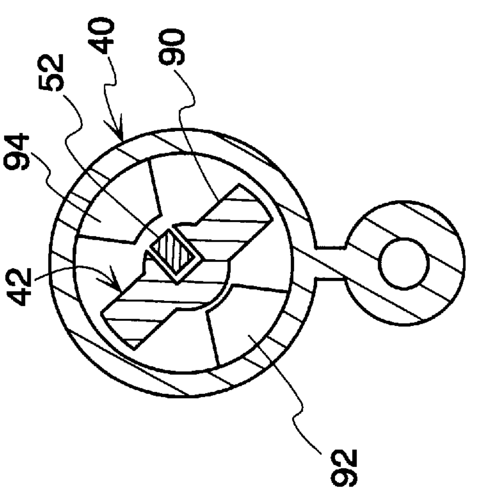
Figure 10A:
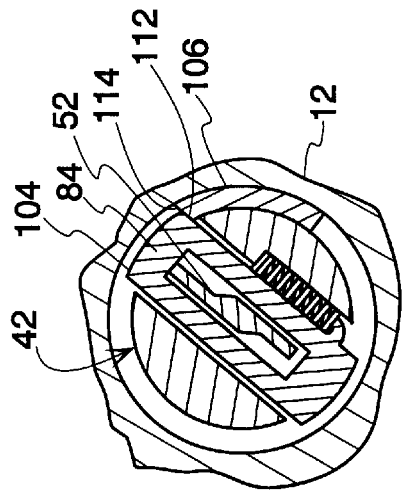
Figure 11B:
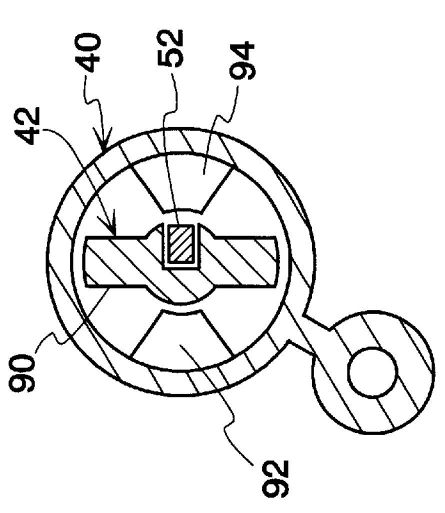
Figure 11A:
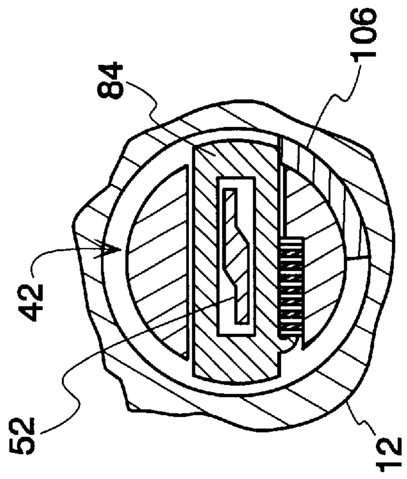

The fully locked position of FIG. 9*b* for the actuator assembly 40 is achievable by pivoting the lock cylinder 42 from the FIG. 8*a* position in the counterclockwise direction, as indicated by the arrow 110, to the position shown in FIG. 9*a*. The cooperation between the extension 90 and the bosses 92, 94 is the same as described transitioning the lock cylinder 42 between corresponding states in FIGS. 5*a* and 6*a* with the key 50 inserted.

To remove the key 52 after the state shown in FIGS. 9*a* and 9*b* is established, the lock cylinder 42 must be pivoted back to the FIG. 8*a* position relative to the housing 2. In the FIG. 9*a* position, the lock cylinder 42 is pivoted in a clockwise direction, as indicated by the arrow 111. Once the FIG. 10*a* position is realized, the end 104 of the repositionable element 84 interferes with the actuator assembly extension 106. More specifically, a circumferentially facing third surface 112 on the repositionable element abuts to a facing surface 114 on the extension 106. Continued clockwise pivoting of the lock cylinder 42 causes the surface 112 to drive the surface 114 to pivot the actuator assembly 40 continuously until the lock cylinder 42 achieves the FIG. 11*a* position. From the FIG. 10*a* position to the FIG. 11*a* position, the actuator assembly 40 is caused to move in the same pivoting range as the lock cylinder 42. This places the actuator assembly 40 in the FIG. 11*b* position in which the actuator assembly 40 is in an "intermediate" locked position between the fully locked position of FIG. 10*b* and the unlocked position of FIG. 8*b*.

The owner of the master key 52 is thus permitted to operate the lock system 10 between the FIGS. 8*a*, 8*b*, and 11*a*, 11*b* positions. However, with the lock system 10 operated using the key 50 and placed with that key in the fully locked position of FIG. 7*b*, the master key 52 cannot be fully inserted since it cannot pass sufficiently through the repositionable 84 to be fully inserted into the keyway 54.

Accordingly, with the lock system 10 in the unlocked state, access can be given to the master key 52 without breaching the system security. That is, the user of the master key 52 can only place the actuator assembly 40 in the intermediate locked state shown in FIG. 11*b* with the master key 52. By doing so, the user of the master key 52 has effectively placed the lock system in a locked state. However, once the lock system 10 is fully locked using the key 50, the master key 52 cannot be inserted and used to unlock the lock system 10.

The foregoing disclosure of specific embodiments is intended to be illustrative of the broad concepts comprehended by the invention.

What is claimed is:

1. A key operated lock actuating system comprising:

a housing;

a lock cylinder that is pivotable relative to the housing around a first axis;

an actuator assembly that is pivotable around the first axis between a fully locked position and an unlocked position;

a first key having a first configuration;

a second key having a second configuration, the lock cylinder comprising a keyway into which each of the first and second keys can be directed with the lock cylinder pivoted relative to the housing into a key removal position, the lock cylinder comprising a repositionable element which is changed from a first position into a second position as an incident of the second key being directed into the keyway, the lock cylinder configured so that direction of the first key into the keyway does not place the repositionable element into the second position;

a first surface on the lock cylinder and a second surface on the actuator assembly which cooperate to allow the first surface to act against and pivot the actuator assembly in one direction around the first axis as the key cylinder is pivoted from the key removal position in the one direction to thereby move the actuator assembly from the unlocked position toward the locked position;

the lock cylinder having third surface and the actuator assembly having a fourth surface which cooperate with the repositionable element in the second position and not in the first position to allow the third surface to act against the fourth surface as the lock cylinder is pivoted oppositely to the one direction to thereby move the actuator assembly toward the key removal position;

the lock cylinder being pivotable with the first key directed into the keyway with the lock cylinder in the key removal position and the actuator assembly in the unlocked position in the one direction around the first axis sufficiently to cause the first surface to act against and move the second surface that the actuator assembly is placed in the fully locked position and being thereafter pivotable oppositely to the one direction around the first axis to place the lock cylinder in the key removal position without changing the actuator assembly from the fully locked position, the lock cylinder being pivotable with the second key directed into the keyway with the lock cylinder in the key removal position and the actuator assembly in the unlocked position in the one direction around the first axis sufficiently to cause the first surface to act against and move the second surface so that the actuator assembly is placed in the fully locked position and being ther after pivotable oppositely to the one direction around the first axis which causes the third surface to act against the fourth surface to thereby move the actuator assembly from the fully locked position to an intermediate position between the fully locked and unlocked positions as the actuator assembly is moved into the key removal position.

2. The key operated lock activating system according to claim 1 wherein the housing defines a cavity within which the lock cylinder resides.

3. The key operated lock activating system according to claim 2 wherein the actuator assembly comprises an extension which projects into the housing cavity and defines the fourth surface.

4. The key operated lock activating system according to claim 1 wherein the repositionable element comprises a wafer that is movable transversely to the first axis between the first and second position.

5. The key operated lock activated system according to claim 1 wherein the second surface faces circumferentially relative to the first axis on the actuator assembly.

6. The key operated lock activated system according to claim 1 wherein the second key directed into the keyway and the actuator assembly in the fully locked position pivoting of the lock cylinder oppositely to the one direction causes the lock cylinder to pivot a predetermined pivoting amount before the third surface acts against the fourth surface.

7. The key operated lock activated system according to claim 1 wherein the third surface is defined on the repositionable element.

8. The key operated lock activated system according to claim 1 wherein there is a single piece on the actuator assembly that extends fully around the first axis and defines the second surface.

9. The key operated lock activated system according to claim 1 wherein the single piece defines the fourth surface.

10. The key operated lock activated system according to claim 1 wherein with the first key directed into the keyway, the lock cylinder is pivotable oppositely to the one direction to cause the third surface to move in a curved path toward and past the fourth surface.

11. In combination:

a lock element that is movable between a secured position and an unsecured position; and a key operated lock activating system, said key operated lock activating system comprising:

a housing;

a lock cylinder that is pivotable relative to the housing around a first axis;

an actuator assembly that is pivotable around the first axis between a fully locked position and an unlocked position;

a first key having a first configuration;

a second key having a second configuration, the lock cylinder comprising a keyway into which each of the first and second keys can be directed with the lock cylinder pivoted relative to the housing into a key removal position, the lock cylinder comprising a repositionable element which is changed from a first position into a second position as an incident of the first key being directed into the keyway, the lock cylinder configured so that direction of the first key into the keyway does not place the repositionable element into the second position;

a first surface on the lock cylinder and a second surface on the actuator assembly which cooperate to allow the first surface to act against and pivot the actuator assembly in one direction around the first axis as the key cylinder is pivoted from the key removal position in the one direction to thereby move the actuator assembly from the unlocked position toward the locked position;

the lock cylinder having a third surface and the actuator assembly having a fourth surface which cooperate with the repositionable element in the second position and not in the first position to allow the third surface to act against the fourth surface as the lock cylinder is pivoted oppositely to the one direction to thereby move the actuator assembly toward the key removal position;

the lock cylinder being pivotable with the first key directed into the keyway with the lock cylinder in the key removal position and the actuator assembly in the unlocked position in the one direction around the first axis sufficiently to cause the first surface to act against and move the second surface so that the actuator assembly is placed in the fully locked position and being thereafter pivotable oppositely to the one direction around the first axis to place the lock cylinder in the key removal position without changing the actuator assembly from the fully locked position, the lock cylinder being pivotable with the first key directed into the keyway with the lock cylinder in the key removal position and the actuator assembly in the unlocked position in the one direction around the first axis sufficiently to cause the first surface to act against and move the second surface so that the actuator assembly is placed in the fully locked position and being thereafter pivotable oppositely to the one direction around the first axis which causes the third surface to act against the fourth surface to thereby move the actuator assembly from the fully locked position to an intermediate position between the fully locked and unlocked positions as the actuator assembly is moved into the key removal position.

12. The combination according to claim 11 wherein with the actuator assembly moved from the fully locked position to the intermediate position, the lock element is moved from the secured position to a partially secured position.

13. The combination according to claim 11 wherein the lock element is pivotable between the secured and unsecured positions.

14. The combination according to claim 11 wherein the lock element is translatable between the secured and unsecured positions.

15. The combination according to claim 11 wherein the actuator assembly directly engages the lock element.

16. The combination according to claim 11 wherein there is an intermediate element that is separate from and movable relative to the actuator assembly and the lock element and transmits movement between the actuator assembly and the lock element.

17. A method of actuating a key operated lock system, said method comprising the steps of:

directing a first key having a first configuration into a keyway in a lock cylinder that is pivotable around a first axis so that the cylinder is placed in a first state;

pivoting the lock cylinder in a first direction around the first axis with the first key directed into the keyway from a key removal position through a first range to thereby pivot an actuator assembly around the first axis between an unlocked position and a fully locked position as an incident of which a lock element is changed from an unsecured state into a secured state;

pivoting the lock cylinder oppositely to the first direction around the first axis with the first key directed into the keyway through the first range to thereby place the lock cylinder in the key removal position and pivot the actuator assembly through a second range from the fully locked position into the unlocked position;

removing the first key with the lock cylinder in the key removal position;

directing a second key having a second configuration into the keyway so that the cylinder is placed in a second state that is different than the first state;

pivoting the lock cylinder in the first direction around the first axis with the second key directed into the keyway from the key removal position through the first range to thereby pivot the actuator assembly around the first axis between the unlocked position and the fully locked position;

pivoting the lock cylinder oppositely to the first direction around the first axis with the second key directed into the keyway through the first range to thereby place the lock cylinder in the key removal position and pivot the actuator assembly from the fully locked position through less than the second range towards but not into the unlocked position; and removing the second key from the keyway with the lock cylinder in the key removal position.

18. The method of actuating a key operated lock system according to claim 17 further comprising the step of relatively repositioning the lock cylinder and actuating the lock cylinder and actuator assembly so that the second key cannot be directed into the keyway with the actuator assembly in the fully locked state and the lock cylinder in the key removal position.

19. The method of actuating a key operated lock system according to claim 17 wherein the lock element is changed between the unsecured state and secured state by pivoting.

20. The method of actuating a key operated lock system according to claim 17 wherein the lock element is changed between the unsecured state and secured state by translation.

* * * * *

UNITED STATES PATENT AND TRADEMARK OFFICE

CERTIFICATE OF CORRECTION

PATENT NO. : 6,604,393 B2
DATED : August 12, 2003
INVENTOR(S) : Larsen et al.

It is certified that error appears in the above-identified patent and that said Letters Patent is hereby corrected as shown below:

Column 8,
Line 9, should read -- and move the second surface so that the actuator assembly --
Line 22, should read -- being thereafter pivotable oppositely to the one direc- --

Signed and Sealed this

Twenty-seventh Day of January, 2004

JON W. DUDAS
*Acting Director of the United States Patent and Trademark Office*